(12) United States Patent
Lewine et al.

(10) Patent No.: US 8,973,021 B1
(45) Date of Patent: Mar. 3, 2015

(54) METHOD AND SYSTEM OF FACILITATING JAVA COMMUNICATION

(75) Inventors: Eric Lewine, Apex, NC (US); Matthew Lenkeit, Cary, NC (US); Millard C. Taylor, II, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 602 days.

(21) Appl. No.: 12/826,994

(22) Filed: Jun. 30, 2010
(Under 37 CFR 1.47)

(51) Int. Cl.
*G06F 3/00* (2006.01)

(52) U.S. Cl.
USPC .......................... 719/329; 715/749; 719/311

(58) Field of Classification Search
USPC .................................. 715/749; 719/311, 329
See application file for complete search history.

(56) References Cited

U.S. PATENT DOCUMENTS

| | | | |
|---|---|---|---|
| 6,052,710 A * | 4/2000 | Saliba et al. | 709/203 |
| 6,175,877 B1 * | 1/2001 | Zerber | 719/310 |
| 6,430,568 B1 * | 8/2002 | Hickey et al. | 1/1 |
| 6,785,891 B1 * | 8/2004 | Allen et al. | 719/313 |
| 6,990,534 B2 * | 1/2006 | Mikhailov et al. | 709/250 |
| 7,428,570 B2 * | 9/2008 | Nobili et al. | 709/203 |
| 2002/0138624 A1 * | 9/2002 | Esenther | 709/227 |
| 2003/0140089 A1 * | 7/2003 | Hines et al. | 709/202 |
| 2003/0218633 A1 * | 11/2003 | Mikhail et al. | 345/760 |
| 2004/0019626 A1 * | 1/2004 | Shepherd et al. | 709/202 |
| 2005/0132085 A1 * | 6/2005 | Marcinkowski | 709/236 |
| 2007/0006036 A1 * | 1/2007 | Devas et al. | 714/38 |
| 2007/0168451 A1 * | 7/2007 | Taylor et al. | 709/207 |
| 2008/0010359 A1 * | 1/2008 | Achtermann et al. | 709/217 |
| 2008/0086736 A1 * | 4/2008 | Timmons | 719/314 |
| 2008/0244445 A1 * | 10/2008 | Trifon et al. | 715/808 |

OTHER PUBLICATIONS

"Inter applet Communication using Java servlet" IBM Technical NNRD449121 Sep. 2001 p. 1.*

* cited by examiner

*Primary Examiner* — Charles E Anya
(74) *Attorney, Agent, or Firm* — Krishnendu Gupta; Jason A. Reyes; John T. Hurley

(57) ABSTRACT

A method for use in facilitating Java communications is disclosed. A Java applet is caused to open a socket on a port number. A JSP having the port number is invoked. A hidden applet is generated, the hidden applet establishing a communication connection between the JSP and the Java applet by opening a socket connection on the same port number.

16 Claims, 5 Drawing Sheets

METHOD AND SYSTEM OF FACILITATING JAVA COMMUNICATION

BACKGROUND

1. Technical Field

This application relates to facilitating communications.

2. Description of Related Art

Information services and data processing industries in general have rapidly expanded as a result of the need for computer systems to manage and store large amounts of data. As an example, financial service companies such as banks, mutual fund companies and the like, now, more than ever before, require access to many hundreds of gigabytes or terabytes of data and files stored in high capacity data storage systems. Other types of service companies have similar needs for data storage.

Client computers can access data by directly communicating with data storage systems or alternatively through host computers. Host computers access data stored in the data storage systems on behalf of client computers that request data from the data storage systems. For example, according to conventional applications, upon receiving a storage access request, a respective host computer accesses a large repository of storage on behalf of the requesting client. Thus, via the host computer (e.g., server), a client has access to the shared storage system through the host computer. In many applications, hi-speed acquisitions of data are possible so that the host servers are able to promptly retrieve and store data from the data storage system.

Conventional storage system management applications typically include a graphical user interface (GUI) that enables a user to graphically manage, control, and configure various types of hardware and software resources associated with a corresponding managed storage system. For example, one conventional storage management application generates a graphical user interface utilized by a user to graphically select, interact with, and manage local or remote devices and software processes associated with the storage system. Based on use of the graphical user interface in combination with an input device such as a hand operated mouse and corresponding pointer displayed on a viewing screen or other display, the user is able to manage hardware and software entities such as file systems, databases, storage devices, and volumes associated with the storage system. Consequently, a storage management station and associated management software enables the user to manage the storage system.

With respect to ways of handling such management, people today use the World Wide Web for a variety of different and diverse tasks, for example, locating information, ordering and buying goods on-line and managing their finances. Many users expect that these applications will operate regardless of what type of computer platform is used.

Java technology, which is a trademark of Sun Microsystems, Inc., helps provide a solution by allowing the creation of computer platform independent programs. The Java technology includes an object orientated programming language and a platform on which to run the Java applications. Java is both a compiled and an interpreted language. The source code that has been written by the application developer is compiled into an intermediate form called a Java bytecode, which is a platform independent language. At a client machine, the Java bytecodes are interpreted by the Java platform and the Java interpreter parses and runs each Java bytecode instruction on the computer. (If the Java bytecode is run as an applet which is described below, it may first be sent over a network to the client machine.)

The Java platform includes the Application Programming Interface (API), which is a large collection of ready-made software components, which provide a variety of capabilities, and the Java Virtual Machine (JVM). Together, the JVM and the API sit on top of the hardware based computer platform and provide a layer of abstraction between the Java program or application and the underlying hardware.

The JVM is made up of software, which can run Java applications on a specific computer platform of a client machine. Before a Java application can be run on a JVM, the Java application must first be translated into a format that the JVM recognizes, which is called a Java class file format. The Java class file format contains all the information needed by a Java runtime system to define a single Java class.

Java applets and Java Server Pages (JSP) are ways to create client interfaces to Java programs that are delivered over the internet. A Java applet is a small program that can be sent along with a Web page to a user that can perform interactive animations, immediate calculations, or other tasks without having to send a user request back to the server. In most situations, Java applets are executed by a JVM.

In order for a JVM to execute an applet, the applet's requisite component files (including class files, images and sounds) must be downloaded from a server to the JVM. This is typically accomplished by sending a file request that typically takes the form of an HTTP or HTTPS request to the server, which responds by providing an HTTP or HTTPS response that includes the URL of the requested file. This request/response procedure is followed for every file for which the JVM requires to execute the applet. In addition, Java Archive (JAR) files may be used to help improve performance of Java applications.

A Java Server Page or JSP provides server-side scripting support for creating server-based web applications. JSP enables developers to insert Java code along with markup code, such as HTML or XML, into a JSP file. When a client requests a JSP from a JSP server the JSP is executed on the server and the resulting content is sent to the client to be loaded into a browser window ("JSP browser window"). Similar to applet-server communication, a JSP request by a client and the content returned to the client by the server may utilize HTTPS or HTTP.

Java sockets may also be used for client-server communication. Java sockets are conventionally a software endpoint that establishes bidirectional communication between a server program and one or more client programs, such as an applet. The socket associates the server program with a specific software or hardware port by way of a port number and may communicate with any client program with a socket associated with that same port. However, Java security features may restrict socket communication. For instance, applets may only be able to open a socket connection with its originating web server.

SUMMARY OF THE INVENTION

A method for use in facilitating Java communications is disclosed. A Java applet is caused to open a socket on a port number. A JSP having the port number is invoked. A hidden applet is generated, the hidden applet establishing a communication connection between the JSP and the Java applet by opening a socket connection on the same port number.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

The current technique may be used to facilitate communication. In one embodiment, the technique is used to facilitate communication by creating a socket connection between a JSP browser window and a Java applet. In some embodiments, use of the technique enables communication between different components of an application that otherwise are unable to communicate. This may provide added functionalities within a particular application by providing components of the application with data that normally is inaccessible to the components or by notifying the component of a particular event it otherwise would be unaware of.

Figure 1:
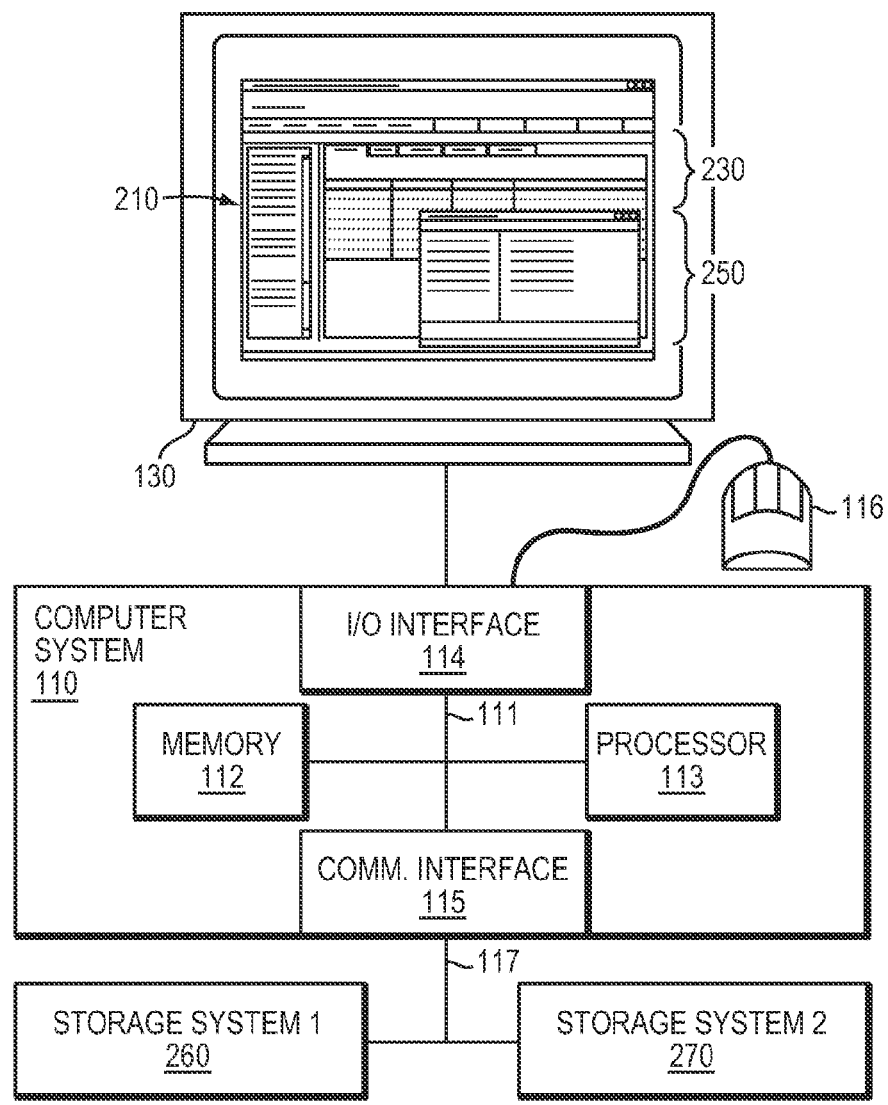
FIG. 1 is an illustration of an example Java-based system.

FIG. 1 is a block diagram illustrating an example embodiment of a system that may be used in connection with performing one or more implementations of the technique described herein. Computer system 110 may be a computerized device such as a personal computer, workstation, portable computing device, console, network terminal or the like. As shown, computer system 110 of the present example includes an interconnect 111 that couples a memory 112, a processor 113, an input/output interface 114 and a communications interface 115. Peripheral device 116 (e.g., one or more viewer controlled devices such as a keyboard, mouse, etc.) couples to processor 113 through I/O interface 114 and enables users to provide input commands and thus control display functions associated with graphical user interface (GUI) 210.

The computer system 110 includes a corresponding display 130 (e.g., a monitor or other visual display device) that renders GUI 210. Users provide input commands to control what information (e.g., tables, pop-up screens, etc.) is displayed on display 130. Computer system 110 may include certain components such as one or more internal devices as well as software applications or processes that operate within or in conjunction with the illustrated components and devices in FIG. 1. In accordance with an example embodiment of the current techniques, computer system 110 may be configured to execute a browser-based Java application that performs or otherwise operates within the computerized system 110. It should also be noted that the computer system 110 may include other processes and/or software and hardware components, such as a computer operating system that controls allocation and use of hardware resources.

Figure 2:
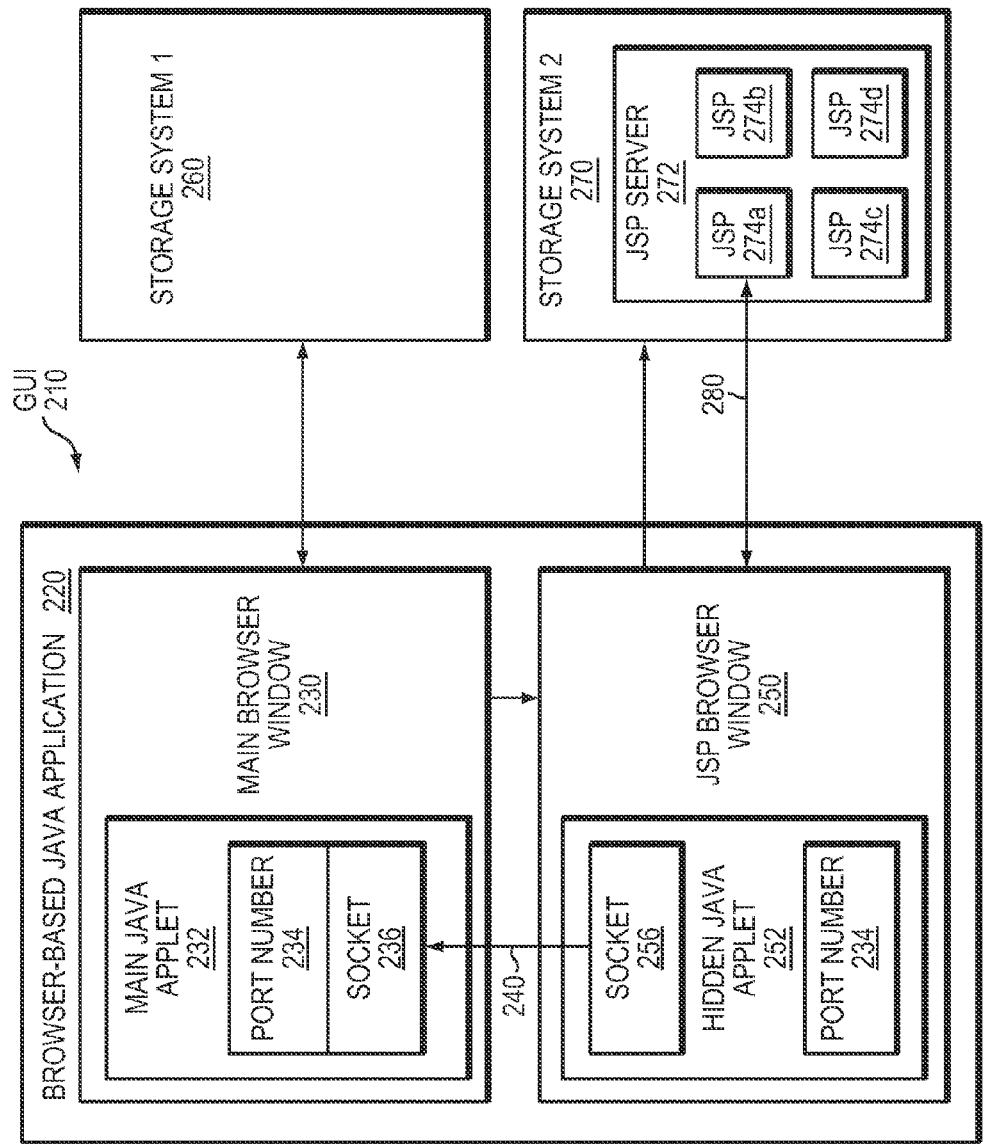
FIG. 2 is a schematic representation of example components that may be used in connection with a Java-based system of FIG. 1.

In accordance with the current techniques, the browser-based Java application example embodiment, as represented by element 220 in FIG. 2, may provide content and functionalities to users through GUI 210. In a particular embodiment, GUI 210 includes a first display region 230 and a second display region 250 on display 130. The first display region 230 may include a browser window that displays content to users and provides users with various functionalities. The second display region 250 may include a browser window that displays content related or unrelated to the content in the first display region. The second display region 250 may also provide users with the same or different functionalities in comparison to the first display region 230. One or both of display regions 230 and 250 may be displayed automatically to users or may be displayed to users (e.g., as a pop-up window) based on an action by a user or some other triggering event. Users viewing display 130 may select different view modes for displaying information in first or second display region 230 and 250. In other embodiments, the content and functionalities provided in both display regions 230 and 250 may be provided by any number of display regions or consolidated into one display region.

Memory 112 is provided to support generation, display, and implementation of content and functional operations of GUI 210. The browser-based Java application 220 embodiment may be embodied as software code such as data and/or logic instructions (e.g., code stored in the memory or on another computer readable medium such as a disk) that supports processing functionality according to different embodiments of the invention as described herein. In this embodiment, during operation, processor 113 may access memory 112 via the interconnect 111 in order to launch, run, execute, interpret or otherwise perform the logic instructions associated with the browser-based Java application 220.

Communications interface 115 enables computer system 110 (and corresponding users) to communicate with other devices and systems (i.e., resources). Communication may be through a communication medium 117 such as a high-speed data communications medium (e.g., Ethernet, optical network, or other type of network) that interconnects a plurality of components. In a storage-network embodiment, the communication medium 117 may be an iSCSI or a Fibre Channel connection. In another embodiment the communication medium 117 may be a HTTPS connection using TCP/IP. The particular type and number of connections may vary in accordance with the particulars of each embodiment.

In an embodiment of the browser-based Java application, the computer system 110 in conjunction with the browser-based Java application may perform different types of data operations in accordance with different types of tasks, which may require the use of communication medium 117. In some embodiments, communication medium 117 may be used to enable communication with attached or remotely located components. For instance, as illustrated by the example embodiment of FIG. 1, computer system 110 may be configured as a storage system management station that uses communication medium 117 to communicate with storage system 1 260 and storage system 2 270.

Data storage systems 260 and 270 may be one or more of the data storage systems offered by EMC Corporation of Hopkinton, Mass. Each of the data storage systems may include one or more data storage devices, such as disks. One or more data storage systems may be manufactured by one or more different vendors. Each of the data storage systems may be inter-connected. The type of communication connection used may vary with certain system parameters and requirements, such as those related to bandwidth and throughput required in accordance with a rate of I/O requests as may be issued by the host computer systems. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment. In such an embodiment each of the data storage systems may include code thereon for performing the techniques as described.

In some embodiments, servers or host systems may provide data and access control information through channels to the storage systems, and the storage systems may also provide data to the host systems also through the channels. Data in a single storage system may be accessed by way of multiple hosts allowing the hosts to share the data residing therein. Data storage devices may also be configured using other logical device layers, which are then exposed to the host or other component using the configured data storage.

Referring again to FIG. 1, conventionally, in certain circumstances, the underlying software of first display region 230 and the second display region 250 presented by GUI 210 on display 130 may not be able to communicate directly. This may be due, for example, to security limitations associated with the display regions. Conventionally, in at least some cases, due to this inability to communicate, an action by a user in the second display region 250 may result in the display of inconsistent or out-of-date content in the display regions. It is desired that actions in one display region be accounted for in the other display region. In some embodiments, enabling communication between the underlying software of the display regions may help provide the user with consistent and up-to-date content and functionalities. Similarly, in some embodiments, enabling communication between the display regions may help provide the user with added functionalities. For instance, in the embodiment of the storage system management station of FIG. 1, an action by a user in one display region may cause the underlying software of the other display region to perform a particular task. The specific advantages may vary depending on the particular embodiment as, for example, any number of display regions with various contents, functionalities, and associations may be used.

In reference to FIG. 2, shown is a block diagram of an example embodiment of the current technique. In some embodiment, GUI 210 provides users with browser-based Java application 220. The browser-based Java application 220 may provide a main browser window 230, depicted as first display region in FIG. 1, which may contain a main Java applet 232 with socket 236 and port number 234 associated with a port (e.g., a software or hardware port). In a particular embodiment, the software underlying main browser window 230 may communicate with storage system 1 260. Some embodiments of the browser-based Java application 220 may also provide browser window 250 in which content produced by a JSP may be loaded ("JSP browser window"), depicted as second display region in FIG. 1, which may contain hidden Java applet 252 with socket 256 and same port number 234 as in main Java applet 232. Use of the same port number 234 by both the main Java applet 232 and the hidden Java applet 252 provides communication channel 240. In a particular embodiment, the software underlying JSP browser window 250 may communicate with storage system 2 270, which contains JSP container 272. JSP container 272 may contain one or more JSP files, 274a-274d.

Figure 3:
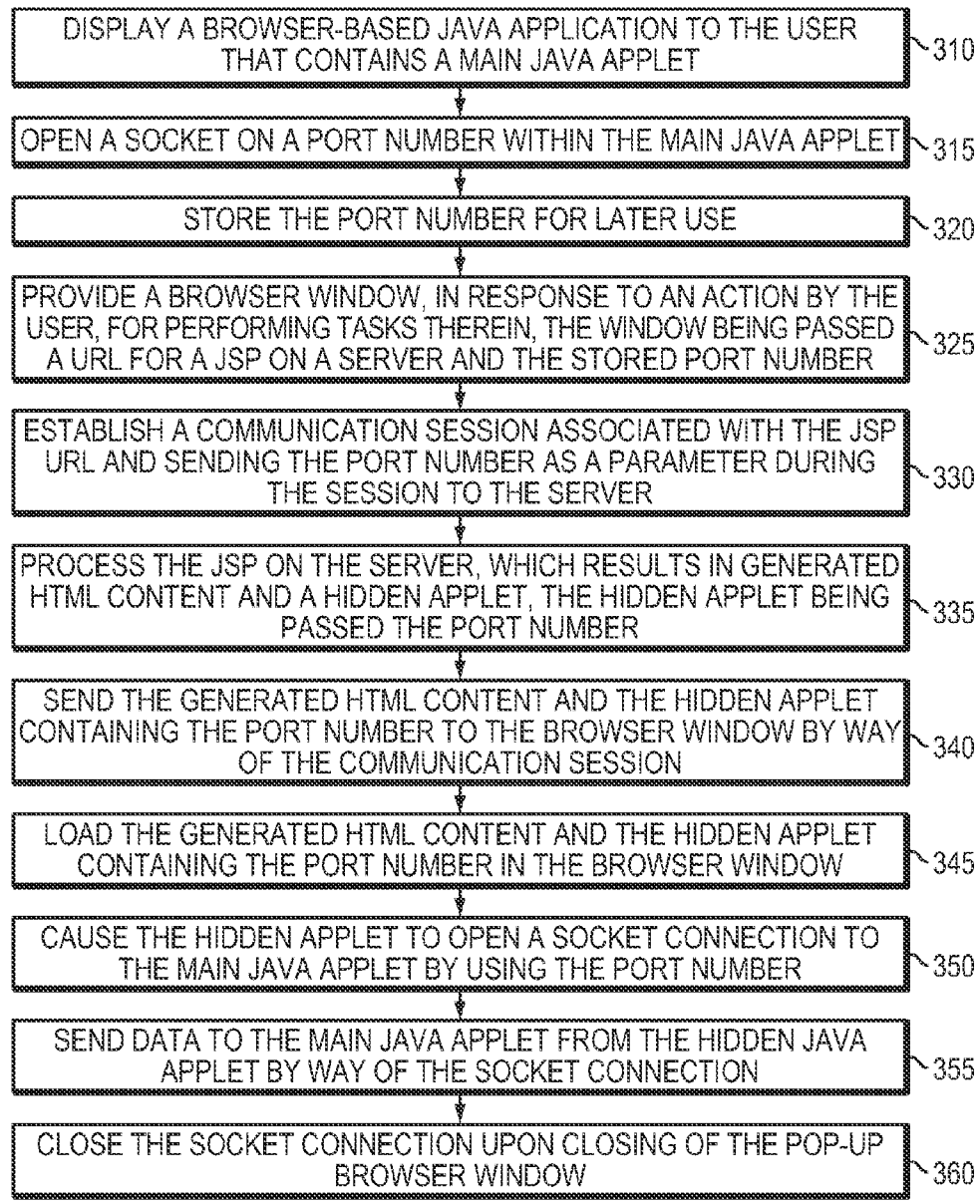
FIG. 3 is a flowchart of an example procedure for use with the embodiments of FIGS. 1 and 2.

A browser-based Java application implemented in accordance with the example embodiment of FIG. 2 helps provide a solution to communication problems such as those explained above in reference to display regions 230 and 250 of FIG. 1 and FIG. 2. The flowchart presented by FIG. 3 provides further explanation.

With reference to the example embodiment of FIG. 2, the browser-based Java application 220, which contains main Java applet 232 within main browser window 230, is displayed to a user (step 310). In this embodiment, when main Java applet 232 is executed, it opens a socket 236 on a particular port number 234 associated with a software or hardware port (step 315). In some embodiments, the socket may be configured to listen to the particular port for communications, to establish connections, and to read from and write to the port. In the particular embodiment of FIG. 2, socket 236 is configured to listen for communications or connection requests. The socket 236 is therefore able to receive communications from other components that connect to port number 234. In some embodiments, to facilitate these future communications, port number 234 may be stored by main Java applet 232, or some other component of the browser-based Java application 220, for later use (step 320).

In accordance with an embodiment of the current techniques, a second browser window, depicted as element 250 in FIG. 1 and FIG. 2, may be provided by the browser-based Java application. In some embodiments, the browser window may be a JSP browser window 250 presented to the user as a window (e.g., a pop-up window) based on an action performed by the user (step 325). In this embodiment, JSP browser window 250 is passed a URL for JSP file 274a and the stored port number 234 (step 325). In the example embodiment of FIG. 2, JSP file 274a is stored within JSP server 272, which is contained within storage system 2 270.

In another embodiment, JSP browser window 250 may be presented to the user when the browser-based Java application 220 is executed. For instance, the JSP browser window 250 may be presented within or alongside main browser window 230. In some embodiments, the user may be able to choose whether the JSP browser window 250 is visible or hidden and where the JSP browser window 250 is located. In other embodiments, second display region 250 may contain content produced other than by a JSP. For instance, in some embodiments, second display region 250 may contain content produced by a Java Servlet. Likewise, in alternative embodiments, first display region 230 may contain content produced in a number of different ways.

In the embodiment of FIG. 2, the software underlying JSP browser window 250 then establishes communication session 280 with JSP file 274a located on JSP server 272 based on the URL that was passed to JSP browser window 250 (step 330). In this embodiment, during communication session 280, stored port number 234 is passed to JSP file 274a (step 330). In some embodiments, communication session 280 may utilize HTTPS to send an HTTPS request to JSP server 272 for JSP file 274a. In this particular embodiment the HTTPS request appends the stored port number 234 to the URL as a parameter. Other embodiments may utilize a different communication protocol, such as HTTP.

As mentioned, Java is a compiled and interpreted language. Thus, in at least some implementations, in response to the request for JSP file 274a, the JSP server 272 compiles JSP file 274a (step 335). In one embodiment, JSP file 274a is compiled into Java bytecode. In an alternative embodiment, before being compiled into Java bytecode, JSP file 274a may be compiled into Java source code for a Java servlet which is stored in server memory to enable faster response times to subsequent requests for JSP file 274a. The Java bytecode can then be executed on the JSP server 270 by a JVM to produce an HTML document or, in some embodiments, a different markup language document such as an XML document (step 335).

In accordance with the current techniques, the produced HTML code includes code for hidden Java applet 252, which is passed port number 234, for example, upon compilation of JSP file 274a (step 335). This may be achieved, in some embodiments, by embedding the necessary code in JSP file 274a to create hidden Java applet 252 and to pull port number 234 from communication session 280, which is to be passed to hidden Java applet 252.

The produced HTML document may then be sent to JSP browser window 250 by way of communication session 280 (step 340). In this example embodiment, once received, JSP browser window 250 loads the HTML content, including hidden Java applet 252 (step 345). Hidden Java applet 252, invisible to a user, may therefore open socket connection 240 with main java applet 232 using port number 234 (step 350). As a result, main java applet 232 and hidden java applet 252 are in a position to share data (step 355). In some embodiments, if the HTML content is loaded in a temporary window, such as a pop-up window, the socket connection 240 may close upon closing of the temporary window (step 360). In other embodiments, the socket connection 240 may close upon completion of one or more tasks. In yet another embodiment, the socket connection 240 may remain open until the browser-based Java application 220 is closed.

Figure 4:
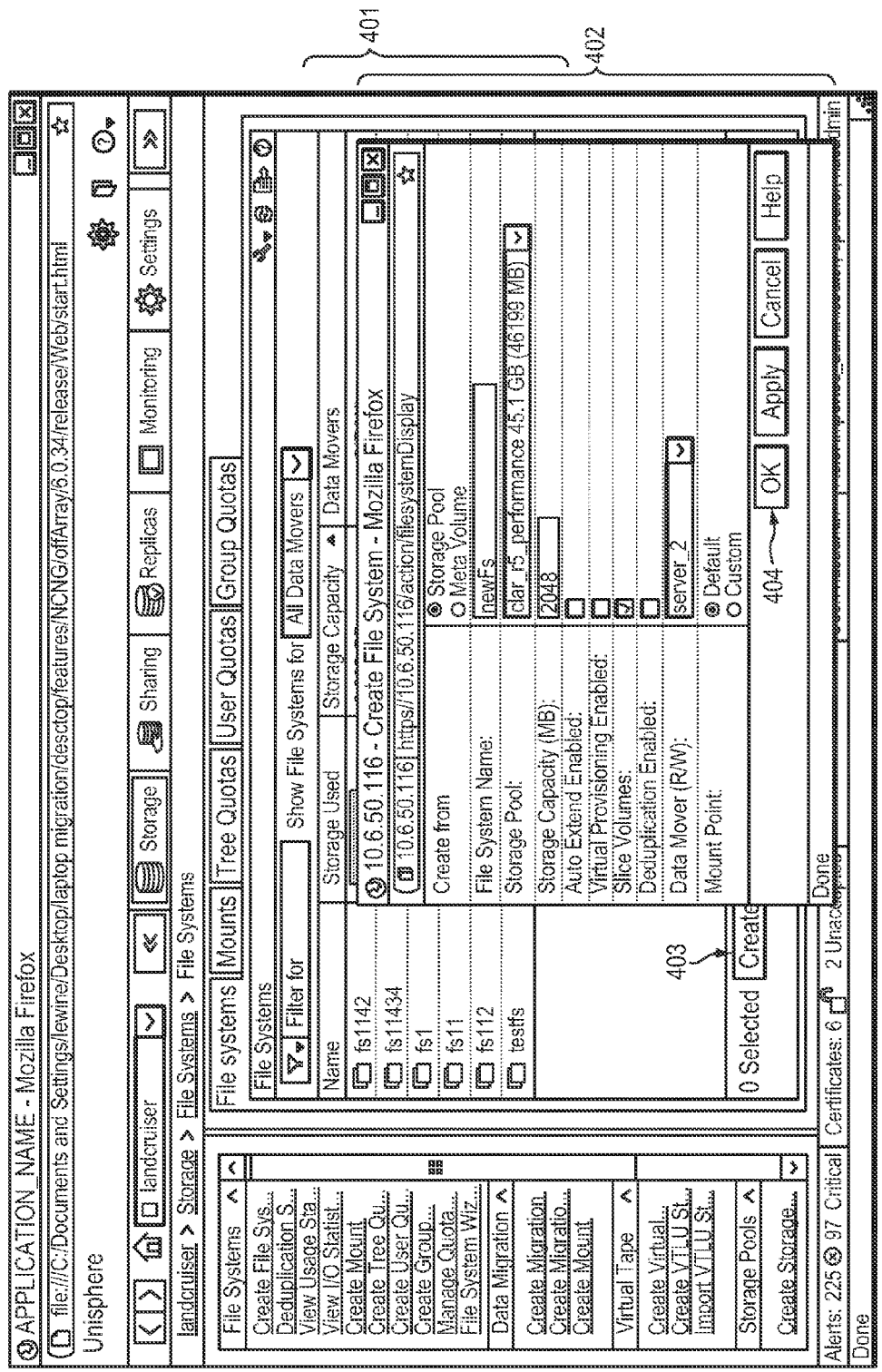
FIGS. 4 and 5 are example GUI screenshots of an embodiment that may be used in connection with the invention.
Figure 5:
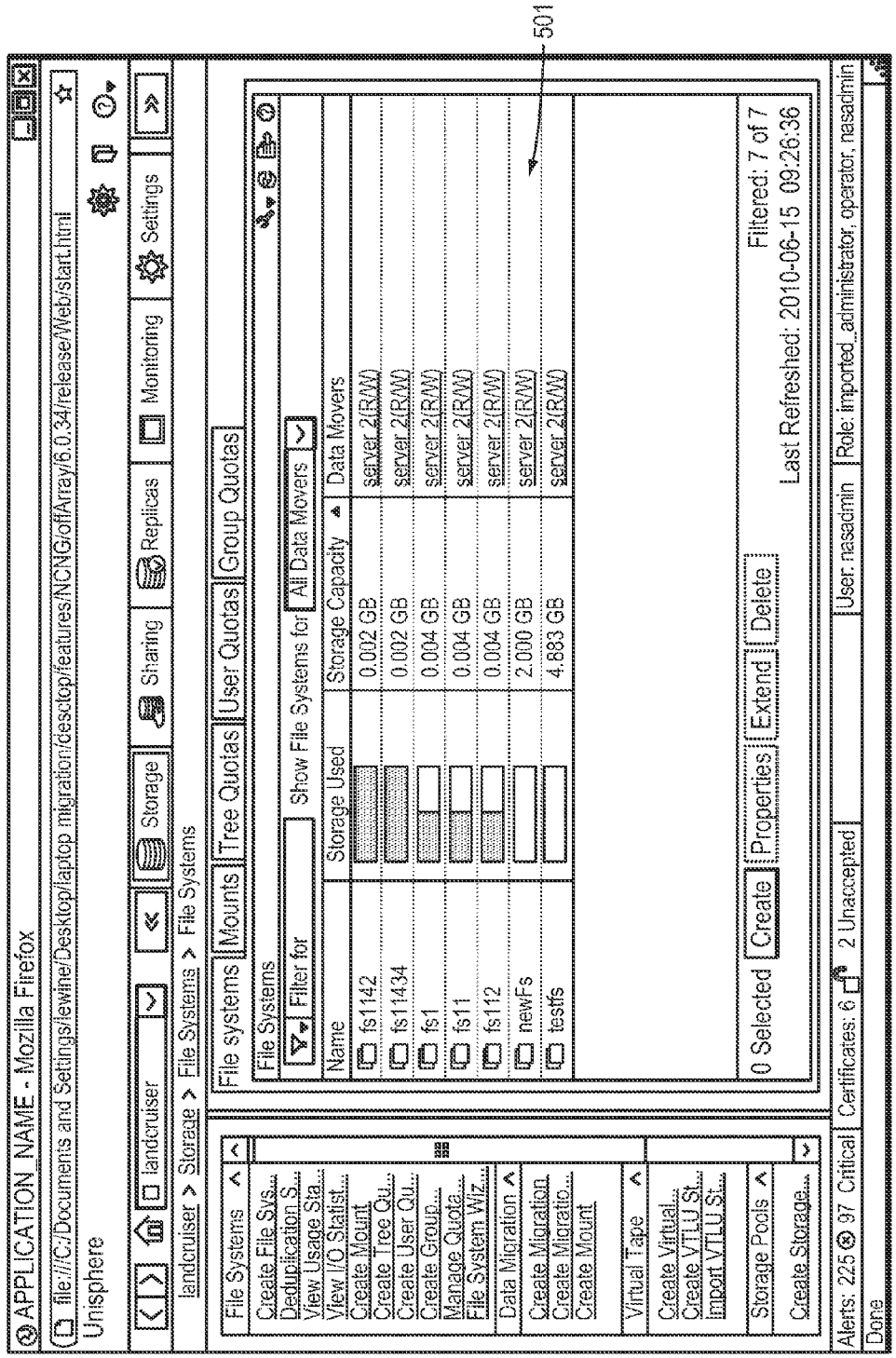

FIG. 4 and FIG. 5 provide screenshots of an example Java-based storage management application embodiment utilizing the current techniques as described above in regards to FIGS. 1-3. In reference to FIG. 4, a user is provided with a main browser window, depicted as display region 401, which consists of a list of current file systems. When the user clicks on "Create" button 403, a pop-up JSP browser window, depicted as display region 402, is displayed that enables the user to create a new file system with specific attributes. Once the desired attributes of the file system are set, the user clicks on "OK" button 404. As a result, the new file system named "newFs" is created and region 401 must now be notified of the change so that it may reflect the existence of the new file system. If the software in connection with display region 401 has no way of communicating with the software in connection with display region 402 due to, for example, a security policy that prevents display regions which originate from different servers from communicating, this notification may be accomplished through a socket connection between regions 1 and 2 that was established in accordance with the flowchart of FIG. 3. Region 401 is therefore able to display the correct information to the user as seen in row 501 of FIG. 5. The pop-up window depicted as region 402 may now close resulting in the closing of the socket connection.

It should be noted that the current techniques are not necessarily limited to Java-based applications. Other programming languages that have the necessary functionalities may be used in place of or in addition to Java to implement the current techniques.

An embodiment may implement the techniques herein using code executed by a computer processor. For example, an embodiment may implement the techniques herein using code which is executed by a processor of the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in facilitating Java communications, the method comprising:
   providing a browser-based java application to a user, the browser-based java application to open a socket on a port having a first port number and storing the having a first browser window providing a first display region having a first Java applet;
   causing the first Java applet to open a socket on a port having a first port number and storing the first port number;
   providing, via the browser-based java application, a second browser window based on a user action, wherein the second browser window is a pop-up window;
   communicating the stored port number and a uniform resource locator (URL) for a Java Server Page (JSP) file stored on a JSP server to the pop-up window;
   establishing a communication connection between the pop-up window and the JSP file stored on the JSP server a Java Server Page (JSP), wherein the stored port number is passed from the pop-up window to the JSP file stored on the JSP server;
   invoking, on the JSP server, the JSP file having the port number, wherein invoking includes generating a document and a hidden applet containing the port number;
   sending the document and the hidden applet containing the port number from the JSP server to the pop-up window; and
   loading the document and the hidden applet containing the port number into the pop-up window, the hidden applet establishing a communication connection between the hidden Java applet in the pop-up window and the first browser window by opening a socket connection on the same port number.

2. The method of claim 1 wherein the Java applet originates from a first server and the JSP originates from a second server.

3. The method of claim 1 comprising:
   closing the socket connection upon closing the pop-window.

4. The method of claim 1 wherein the Java applet and the JSP are associated with the same browser-based Java application.

5. The method of claim 1 further comprising:
   utilizing the communication connection to send one or more notifications to the Java applet from the hidden applet.

6. The method of claim 1 further comprising:
   passing the port number to the JSP as a parameter.

7. The method of claim 1 further comprising:
   passing the port number to the hidden applet upon compilation of the JSP.

8. The method of claim 1 wherein the port number is associated with a software port.

9. A system for use in facilitating Java communications, the system comprising:
   first hardware logic configured to:
      provide a browser-based java application to a user, the browser-based java application having a first browser window providing a first display region having a first Java applet and having a second browser window, wherein the second browser window is provided based on user action and wherein the second browser window is a pop-up window;
cause the first Java applet to open a socket on a port having a first port number and storing the first port number;
communicate the stored port number and a uniform resource locater (URL) for a Java Server Page (JSP) file stored on a JSP server to the pop-up window;
establish a communication connection between the pop-up window and the JSP file stored on the JSP server, wherein the stored port number is passed from the pop-up window to the JSP file stored on the JSP server;
second hardware logic configured to invoke, on the JSP server, the JSP file having the port number, wherein invoking includes generating a document and a hidden applet containing the port number; and
third hardware logic configured to load the document and the hidden applet containing the port number into the pop-up window, the hidden applet establishing a communication connection between the hidden Java applet in the pop-up window and the first browser window by opening a socket connection on the same port number.

10. The system of claim 9 wherein the Java applet originates from a first server and the JSP originates from a second server.

11. The system of claim 9 comprising:
closing the socket connection upon closing the pop-window.

12. The system of claim 9 wherein the Java applet and the JSP are associated with the same browser-based Java application.

13. The system of claim 9 further comprising:
fourth hardware logic configured to utilize the communication connection to send one or more notifications to the Java applet from the hidden applet.

14. The system of claim 9 further comprising:
fourth hardware logic configured to pass the port number to the JSP as a parameter.

15. The system of claim 9 further comprising:
fourth hardware logic configured to pass the port number to the hidden applet upon compilation of the JSP.

16. The system of claim 9 wherein the port number is associated with a software port.

* * * * *